United States Patent [19]

Freudenschuss et al.

[11] E Re. 30,808

[45] Reissued Dec. 1, 1981

[54] FILM-TRANSPORT CONTROL FOR SOUND-FILM CAMERA

[75] Inventors: Otto Freudenschuss; Otto Kantner; Peter R. von Belvard, all of Vienna, Austria

[73] Assignees: Karl Vockenhuber; Raimund Hauser, both of Vienna, Austria

[21] Appl. No.: 9,792

[22] Filed: Feb. 6, 1979

Related U.S. Patent Documents

Reissue of:

[64] Patent No.: 4,037,947
Issued: Jul. 26, 1977
Appl. No.: 669,084
Filed: Mar. 22, 1976

U.S. Applications:

[63] Continuation-in-part of Ser. No. 460,136, Apr. 11, 1974, abandoned.

[30] Foreign Application Priority Data

May 24, 1973 [AT] Austria ..... 4565/73
May 21, 1975 [AT] Austria ..... 3906/75

[51] Int. Cl.[3] ..... G03B 31/02

[52] U.S. Cl. ..... 352/27; 352/14; 352/72

[58] Field of Search ..... 352/27, 72, 29, 14, 352/30, 31

[56] References Cited

U.S. PATENT DOCUMENTS

| | | | |
|---|---|---|---|
| 2,562,379 | 7/1951 | Davis . | |
| 3,825,327 | 7/1974 | Kosarko | 352/72 |
| 3,880,504 | 4/1975 | Marvin | 352/72 |
| 3,957,363 | 5/1976 | Hayashi | 352/72 |
| 3,963,331 | 6/1976 | Komine | 352/72 |
| 3,967,886 | 7/1976 | Komine | 352/72 |
| 3,970,378 | 7/1976 | Takagi | 352/72 |

FOREIGN PATENT DOCUMENTS

| | | |
|---|---|---|
| 220845 | 4/1962 | Austria . |
| 250168 | 10/1966 | Austria . |
| 270384 | 4/1969 | Austria . |
| 288164 | 2/1971 | Austria . |
| 481231 | 8/1929 | Fed. Rep. of Germany . |
| 522336 | 4/1931 | Fed. Rep. of Germany . |
| 525889 | 5/1931 | Fed. Rep. of Germany . |
| 1170246 | 5/1964 | Fed. Rep. of Germany . |
| 1280670 | 10/1968 | Fed. Rep. of Germany . |
| 2203995 | 8/1972 | Fed. Rep. of Germany . |
| 2103884 | 9/1972 | Fed. Rep. of Germany . |
| 2144385 | 7/1974 | Fed. Rep. of Germany . |
| 2407718 | 8/1974 | Fed. Rep. of Germany . |
| 520998 | 5/1972 | Switzerland . |
| 1165981 | 10/1969 | United Kingdom . |

*Primary Examiner*—Monroe H. Hayes
*Attorney, Agent, or Firm*—Montague & Ross

[57] ABSTRACT

A cine camera for taking talking pictures, in which a film is moved intermittently past an image gate by a reciprocating traction claw and continuously past a recording head by a rotating capstan coacting with a pinch roller, includes a latch by which the pinch roller can be held spaced from the capstan in an inactive position. The latching of the pinch roller in this inactive position, against the force of a biasing spring providing the necessary contact pressure during filming, is accomplished upon deactivation of the film drive by the residual kinetic energy of an inertial mass such as a flywheel which is coupled with either the capstan drive or the claw drive. The latch is released upon actuation of a trigger, either directly or through the intermediary of the claw drive. The biasing spring may be part of a toggle mechanism tripped by a presetting member, such as a sensor detecting the presence of a sound-film cassette in the camera.

20 Claims, 20 Drawing Figures

FIG. 3C
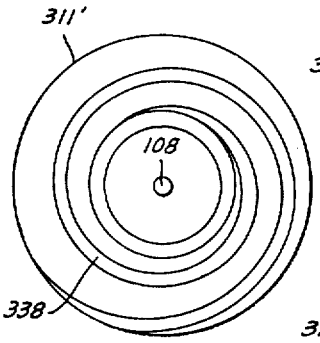
FIG. 3A
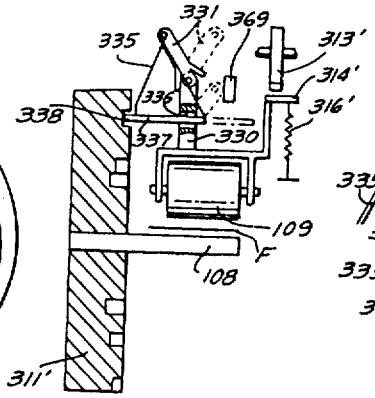
FIG. 3B
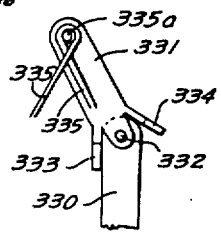
FIG. 4A
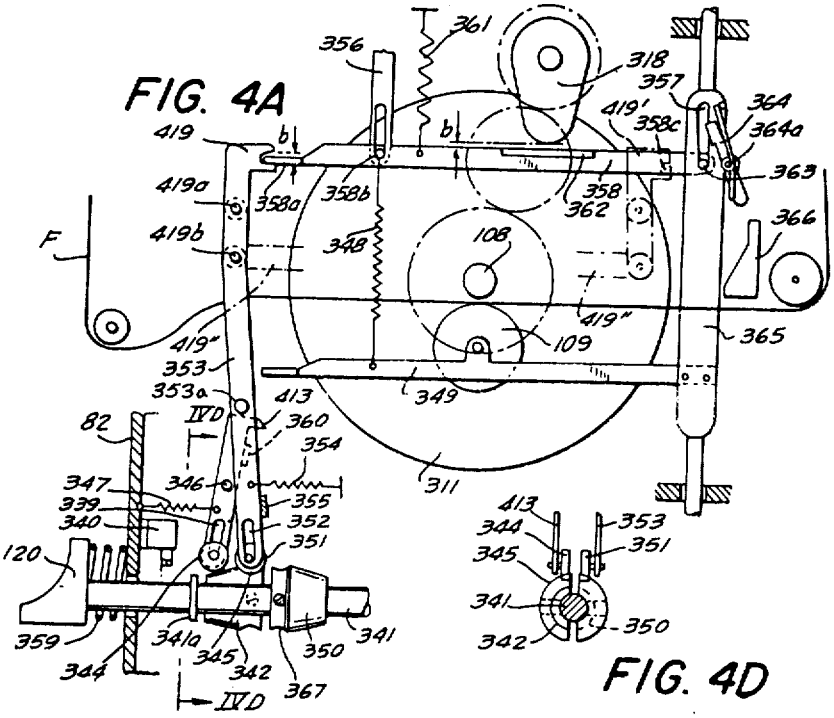
FIG. 4D

FILM-TRANSPORT CONTROL FOR SOUND-FILM CAMERA

Matter enclosed in heavy brackets [ ] appears in the original patent but forms no part of this reissue specification; matter printed in italics indicates the additions made by reissue.

CROSS-REFERENCE TO RELATED APPLICATION

This is a continuation-in-part of our copending application Ser. No. 460,136 filed Apr. 11, 1974 and now abandoned.

FIELD OF THE INVENTION

Our present invention relates to a cine camera adapted to accommodate a motion-picture film having a sound track, the camera being provided with an exposure or image gate and sound-recording means.

BACKGROUND OF THE INVENTION

In such a cine camera the perforated film must be transported intermittently, by the usual reciprocating-claw mechanism, past the exposure gate and at substantially constant speed past the recording head. An advantageous constant-speed feeder comprises a driven capstan and a pinch roller serving to clamp the film between itself and the capstan. Means for co-ordinating the two drives have been described in our prior application referred to above and in our copending application Ser. No. 669,085 filed Mar. 22, 1976 as a continuation-in-part thereof.

As further disclosed in that prior application and in the aforementioned continuation-in-part thereof, as well as in our copending applications Ser. Nos. 669,338 and 669,110 filed Mar. 22, 1976 as two other continuations-in-part of that prior application, the pinch roller and the capstan should be widely separated during the loading of the camera with a sound-film cassette in order to provide the necessary clearance for the insertion of an unsupported stretch of film therebetween; upon such insertion, and prior to the operation of a release button or trigger to start the film drive, the pinch roller and/or the capstan must be displaced to reduce their separation in order that a sound film can be engaged and transported thereby. Such displacement need not immediately clamp the film between the capstan and the pinch roller but may establish an intermediate or standby position from which the clamping position is reached upon operation of the trigger. In accordance with the disclosure of our two copending applications last referred to, the relative displacement of the pinch roller and the capstan from a retracted insertion position to at least a standby position is carried out either under the control of a sensor, detecting the presence of a sound-film cassette in a receiving chamber of the camera casing, or with the aid of a manually operable external actuating member on that casing, this actuating member being independent of the trigger and comprising for example a bar manipulable by the fingers of a user or a door or lid of the cassette-receiving chamber.

OBJECTS OF THE INVENTION

The principal object of our present invention is to provide means for precisely correlating the operation of a film-clamping mechanism, as described above, with at least the stopping and preferably also the starting of the intermittent film drive including the aforementioned traction-claw mechanism.

An ancillary object is to minimize operating noise and wear in such a system.

SUMMARY OF THE INVENTION

A cine camera embodying our present invention comprises relatively displaceable support means for the pinch roller and the capstan, the support means including a movable member which determines the relative spacing of the roller from the capstan and which is usually part of the pinch-roller mounting. It should be understood, however, that our invention also covers a mechanically equivalent kinematic inversion in which the capstan is displaced toward the pinch roller and is therefore supported by that movable member. From an inactive position, which may be either the insertion position or the standby position referred to above, the movable support member is urged by a biasing force into an active or working position in which the film is clamped between the roller and the capstan; this displacement, however, is normally prevented by latch means releasably retaining the support member in its inactive position, the latch means being operatively linked (directly or indirectly) with actuating means such as the aforementioned trigger for releasing this member at the start of a picture-taking operation. At the end of that operation, i.e. upon a de-energization of the intermittent traction-claw drive by the actuating means, a restoring mechanism coupled with the claw drive re-engages the movable member with its latch means by the residual kinetic energy of the film-feeding system. That residual kinetic energy may be stored in an inertial mass coupled with a continuously rotating element of the system, such as a flywheel rigid with the capstan or a shutter disk mounted on a drive shaft for the traction claw. In the latter instance, pursuant to a further feature of our invention, an element of the restoring means positively connected with this drive shaft may coact with the movable support member for relatching same and may concurrently arrest the traction claw in a predetermined position of that member. Another such element may intervene in the release of that movable member in order to start the advance of the film in another predetermined claw position which may substantially coincide with the first-mentioned position.

The biasing force acting upon the movable support member may be supplied by presetting means operable independently of the actuating means to displace that member from its insertion position into its standby position, e.g. under the control of a cassette feeler, as described in our two copending applications Ser. Nos. 669,338 and 669,110. In that instance the biasing means may be a spring included in a toggle mechanism which reverses the direction of the force acting upon the support member, that biasing force then tending to increase the separation between the pinch roller and the capstan in the insertion position.

BRIEF DESCRIPTION OF THE DRAWING

The above and other features of our present invention will not be described in detail with reference to the accompanying drawing in which:

FIG. 3A shows, in axial cross-section, a flywheel adapted to be used in a mechanism similar to that of FIGS. 2A-2D for controlling the separation of a pinch roller from a capstan;

FIG. 3B is an enlarged detail view of part of the assembly of FIG. 3A;

FIG. 3C is a face view of the flywheel shown in FIG. 3A;

FIGS. 4A-4C show three distinct positions of another roller-control mechanism according to our invention;

FIG. 4D is a cross-sectional detail view taken on the line IVD—IVD of FIG. 4A;

SPECIFIC DESCRIPTION

Figure 1:
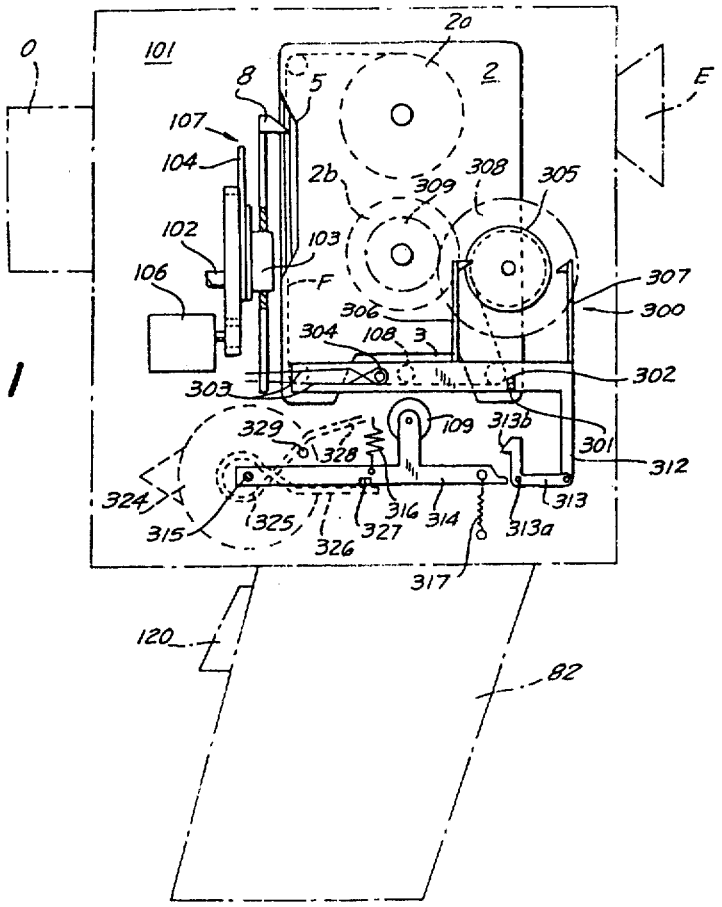
FIG. 1 is a somewhat diagrammatic side-elevational view, with parts broken away, of a cine camera embodying our invention.

In FIG. 1 we have shown a motion-picture camera with a casing 101 having a chamber for receiving either a sound-film cassette 2, with legs defining between them a recess 3, or a nonillustrated silent-film cassette of lesser height lacking these legs. A perforated film F with a conventional sound track travels from a takeup spool 2a to a supply spool 2b within cassette 2 across a cutout 5, confronting an image gate in line with an objective O, and across the recess 3 accommodating a capstan 108 and a recording head 46 (see FIG. 9A). A pinch roller 109, rotatably journaled on a lever 314, is widely separated from capstan 108 in an insertion position (i.e. the position illustrated in FIG. 1) which allows the camera to be loaded with the cassette 2. The inserted cassette can be indexed in its position by a nonillustrated detent whereupon a lid or door of the receiving chamber can be closed.

Figure 9A:
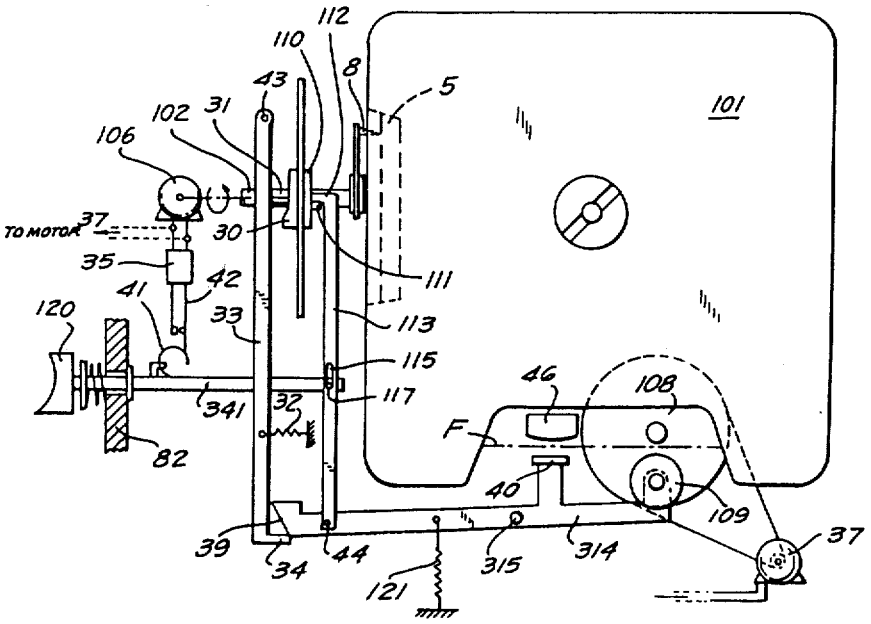
FIG. 9A shows a modification of the mechanism of FIG. 8.

Camera housing 101 is further shown provided with an eyepiece E and also has a handle 82 equipped with the usual release button or trigger 120. Handle 82 may contain the batteries for powering a drive motor 106 for a traction claw 8 engageable with the film perforations in the vicinity of the image gate as is well known per se. Motor 106 may be drivingly connected with capstan 108 via a nonillustrated transmission; alternatively, the capstan may be driven by a separate motor whose energizing circuit is closed and opened simultaneously with that of motor 106 by the trigger 120, as shown in FIG. 9A.

Motor 106 is coupled with traction claw 8 by way of a transmission 107 including a drive shaft 102 which carries an eccentric 103 and a shutter blade 104, the shutter 104 periodically obstructing the image gate as is well known per se.

Takeup spool 2b is driven from traction claw 8 by a mechanism 300 of the type described in commonly owned Austrian Pat. No. 296,021, that mechanism including a lever 312 fulcrumed on a pin 301 which enters a bottom slot 302 of the lever. A hairpin spring 303, with crossed legs abutting nonillustrated stops on lever 312, embraces a stud 304 on that lever and resiliently links it with the claw 8 whose reciprocation is thus translated into a combined oscillatory and sliding motion of the lever. That compound motion, in turn, unidirectionally drives a ratchet 305 with the aid of two pawls 306, 307 alternately engageable therewith, the pawls being disposed on opposite sides of fulcrum 301. On the upstroke, lever 312 rocks clockwise about that fulcrum whereby pawl 306 engages the teeth of ratchet 305 to turn same in a clockwise sense. On the downstroke, the lever rocks counterclockwise and renders the pawl 307 effective to continue the clockwise rotation of the ratchet. This rotation is transmitted by way of two spur gears 308 and 309 to the shaft of spool 2b, the transmission normally including a slipping clutch to allow for the progressive increase of the diameter of the film body wound on spool 2b.

Lever 312 is articulated to the latch 313 swingable about a fixed pin 313a, the latch having a hook 313b adapted to engage the right-hand end of lever 314 when the latter is swung counterclockwise about its pivotal axle 315 against the force of a restoring spring 317 under the control of a stronger biasing spring 316 by a mechanism described hereinafter with reference to FIGS. 2A-2D. A mode-selector switch 324, rotatable about axle 315 between two positions I and II, carries a pin 329 which in position I bears upon a leg 328 of a hairpin spring 325 whose other leg 326 engages an abutment 327 of lever 314; in the alternate switch position II, pin 329 depresses the leg 326 and allows the other leg 328 to hold down the abutment 327 against the force of spring 316. Thus, switch 324 facilitates a clockwise swing of lever 314 in position I but prevents such swing in position II.

FIGS. 2A-2D show the biasing spring 316 anchored to another lever 320 having a fixed fulcrum at 321. The shaft of capstan 108 carries a flywheel 311 and is coupled by way of a gear train 310 with a cam 318 rotatable at higher speed on a shaft 318a. Lever 320 has a cam-follower ledge 322 confronting the cam 318, the cam being ineffectual in the position of FIG. 2A in which the left-hand end of lever 320 is engaged by a hook 323 of a catch 319 which has a fixed fulcrum at 319a and is biased counterclockwise by a spring 319b. The upper edge of hook 323 is beveled to hold the ledge 322 separated from the high dwell of cam 318 by a minimum distance b; this measure reduces both wear and noise.

With selector 324 indexed in its position I, corresponding to sound-film operation, the combined force of springs 316 and 325 overcomes that of spring 317 to bias the lever 314 counterclockwise. On standstill, however, spring 303 holds the lever 312 in a substantially horizontal median position in which the hook 313b of latch 313 prevents any further ascent of pinch roller 109 toward capstan 108. When the user depresses the trigger 120 to start the film drive, motor 106 is switched on and claw 8 is reciprocated. Upon the first downstroke of the claw, lever 312 descends beyond its normal position whereby latch 313 is swung clockwise about its pivot 313a to release the lever 314 which therefore moves from the position of FIG. 2A into the one of FIG. 2B whereby the film F is clamped between the pinch roller 109 and the capstan 108; since the capstan has already been set in rotation by the actuation of the trigger, the film is now advanced concurrently by the reciprocating claw 8 and by the transport mechanism 108, 109.

Figure 2A:
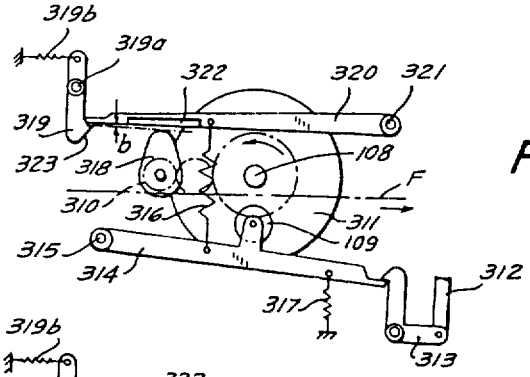
FIGS. 2A-2D are diagrammatic views of a mechanism for controlling a pinch roller in accordance with our invention, shown in four distinct positions.
Figure 2B:
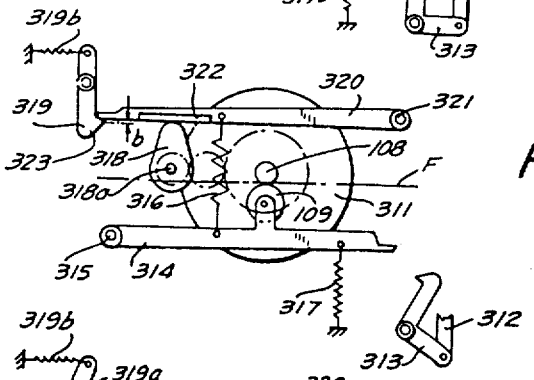
Figure 2C:
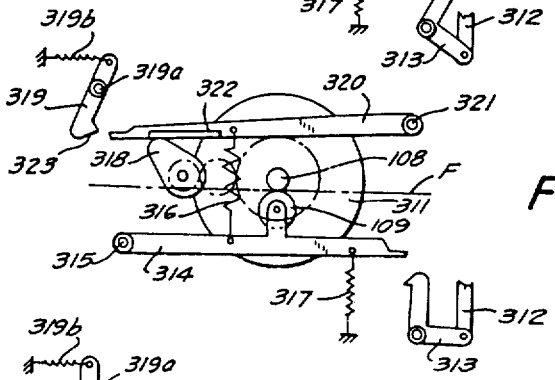
Figure 2D:
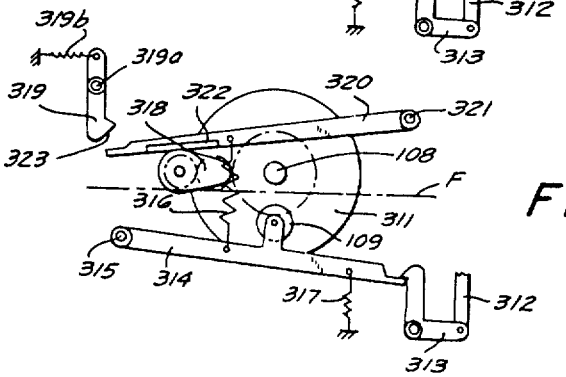
Figure 2E:
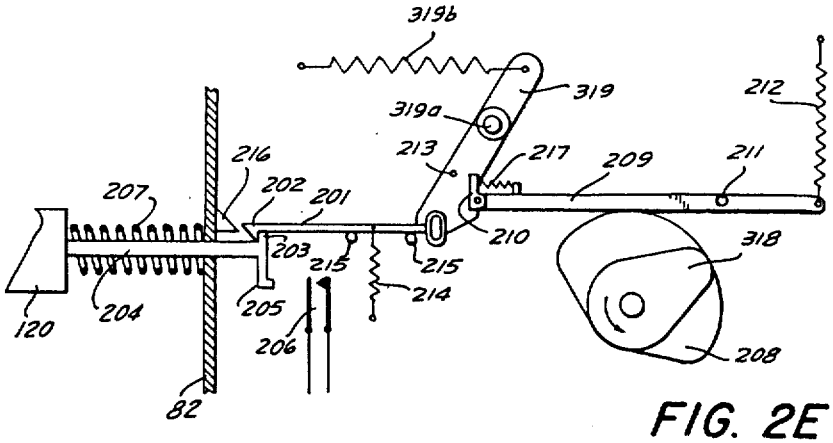
FIG. 2E is a schematic detail view of part of that mechanism.

By way of a mechanical linkage shown in FIG. 2E, catch 319 is momentarily disengageable from lever 320 (against the force of spring 319b) whenever the trigger 120 is released to stop the film drive. Upon such release, with cam 318 still rotating by virtue of the residual kinetic energy stored in flywheel 311, this cam coacts with ledge 322 as illustrated in FIGS. 2C and 2D. When the low dwell of cam 318 confronts the ledge 322, lever 320 swings counterclockwise and relaxes the biasing spring 316 sufficiently to let the restoring spring 317 draw the lever 314 against the force of spring leg 326 (FIG. 1) into re-engagement with latch 313 (FIG. 2D) which has been returned to its normal position by the hairpin spring 303 acting upon lever 312. Immediately thereafter, as the high dwell of cam 318 again acts upon ledge 322, lever 320 is re-engaged by the catch 319 (which has escaped from the trigger-controlled linkage) so as to re-establish the normal position of FIG. 2A.

In FIG. 2E we have shown the catch 319 articulated to an arm 201 having a hook 202 engageable by a dog 203 on a stem 204 carrying the trigger 120. A lug 205 on that stem serves to close a switch 206 in the energizing circuit of motor 106 (FIG. 1) when the trigger is depressed against the force of a spring 207. Cam 318 is rigid with another cam 208 whose high dwell, extending roughly over a semicircle, acts upon a lever 209 which has an articulated finger 210 biased by a spring 217 into the erect position shown. Lever 209 is fulcrumed on a pin 211 and is biased counterclockwise by a spring 212. A pin 213 on catch 319 coacts with the finger 210 when the lever 209 rides on the high dwell of cam 208. Another spring 214 normally holds the arm 201 onto a pair of guide pins 215 but allows that arm to be raised by the rightward-moving dog 203 as well as by stationary ramp 216 carried on an inner wall surface of handle 82.

When the trigger 120 is depressed to close the switch 206, dog 203 passes ineffectually under the hook 202 of arm 201 which at this point lies to the right of the position shown in FIG. 2E, catch 319 being then in engagement with lever 320 as shown in FIGS. 2A and 2B. Upon the release of the trigger, dog 203 entrains the hook 202 to the left and swings the catch 319 about its pivot 319a, against the force of spring 319b, so as to release the arm 320 as shown in FIG. 2C. If the cam 318 is about to approach the ledge 322 of lever 320, cam 208 elevates the finger 210 into the path of pin 213 without, however, preventing the clockwise swing of the catch into the position of FIG. 2E in which the pin lies to the left of finger 210. When the trigger 120 reaches its fully extended position, hook 202 rides up the ramp 216 and leaves the dog 203 so that spring 319b can start the return swing of catch 319. The presence of finger 210 in the path of pin 213, however, prevents that return swing until the high dwell of cam 318 has moved away from the vicinity of ledge 322 so as to avoid a premature relatching of lever 320.

Naturally, there is no delay in the return swing of catch 319 if the cams 318 and 208 are in an ineffectual position at the instant when the trigger 120 is released.

The restoring mechanism of FIG. 2E may be replaced by one similar to that shown in FIG. 4A and described hereinafter.

With the mode-selector switch 324 indexed in position II, hairpin spring 325 overcomes the force of spring 316 to prevent the upswing of pinch roller 109 toward capstan 108 upon the start of the film drive. Switch position II can also be used to widen the gap between the capstan and the pinch roller during the loading of the camera with a sound-film cassette 2, thus allowing the separation therebetween to be less in the position of FIG. 1 which the lever 314 assumes upon the return of switch 324 to position I.

In FIGS. 3A and 3C we have shown a modified flywheel 311' rigid with capstan 108, the pinch roller 109 lying above the capstan in this instance and being carried by a bracket 330 (see FIG. 3B) at the end of a lever 314' which is biased downwardly by a spring 316'. Bracket 330 is articulated at 332 to a lug 331 with lateral wings 333 and 334 straddling the bracket whereby the lug 331 can swing between two alternate stable positions, i.e. The one shown in full lines in FIGS. 3A and 3B and the one indicated in dot-dash lines in FIG. 3A. A hairpin spring 335 embraces a pin 335a on the free end of lug 331 and carries a cam-follower rod 337 freely traversing a bore 336 in bracket 330. Lug 331 and spring 335 constitute a toggle mechanism which in the full-line position lets the rod 337 engage in a spiral camming groove 338 of flywheel 311', that groove becoming progressively more shallow with increasing distance from the flywheel axis.

A latch 313' operates similarly to latch 313 of FIGS. 2A–2D to release the lever 314' upon the start of the film drive, that release occurring here on the first upstroke of the traction claw 8 (FIG. 1). Spring 316' thereupon lowers the bracket 330 so that the film F is clamped between capstan 108 and roller 109. At this stage, and throughout the filming operation, lug 331 is in its dotted-line position with rod 337 withdrawn from the camming groove 338 of flywheel 311'. Upon the release of trigger 120, an arm 369 linked with that trigger moves to the left as viewed in FIG. 3A, thereby initiating a counterclockwise swing of lug 331 into its full-line position in which the rod 337 enters a full-circle inner turn of groove 338. With the flywheel 311' and the capstan 108 continuing their rotation beyond the deenergization of their drive motor, by virtue of the kinetic energy stored in the flywheel, rod 337 is elevated by the camming groove 338 and raises the bracekt 330 with pinch roller 109 into the inactive position in which the lever 314' is re-engaged by the latch 313'. Shortly thereafter, rod 337 is cammed out of the groove 338 and moves the spring 335 past dead center, with the result that lug 331 flips over into its phantom-line position and separates the rod 337 from the flywheel 311'. With arm 369 ineffectual during depression of the trigger, the subsequent release of lever 314' by latch 313' restarts the cycle.

In FIGS. 4A–4D we have shown a modified system including a latch 413 which is fulcrumed on a fixed pin 346 and is biased in a clockwise sense (as viewed in FIGS. 4A–4C) by a spring 347 anchored to a wall of handle 82 carrying the trigger 120. The clockwise swing of latch 413 is limited by a fixed stop 360. Trigger 120 is shown mounted on a stem 341 and is biased outwardly by a spring 359; a collar 314a on stem 341 opens a switch 340 when the trigger is released, that switch lying in the energizing circuit of drive motor 106 (FIG. 1).

Stem 341 carries a pair of cams 342 and 350 having the shape of mutually complementary but relatively inverted halves of a frustocone, each of these cams being provided near its broader base with a semiannular peripheral groove 345 and 367, respectively. The two cams co-operate with respective cam followers in the form of rollers 344 and 351 whose shafts are vertically movable in guide slots 339 and 352 of latch 413 and of a lever 353, the latter being articulated at 419b to a catch 419 having a fixed fulcrum at 419a. Lever 353, with a fixed fulcrum 353a, is biased in a counterclockwise sense by a spring 354 and thus tends to swing the catch 419 clockwise about its pivot, the extent of that swing being limited by a fixed stop 355 engaging the lower end of lever 353 in the working position of FIG. 4A. In that working position, catch 419 engages an extremity 358a of an arm 358 having a ledge 362 which confronts the cam 318 driven, as in the embodiment of FIGS. 2A–2E, by the capstan 108 carrying the flywheel 311. Catch 419 has a beak with a beveled surface designed, like the hook 323 of catch 319, to separate the cam 318 from its follower (here the ledge 362) by a distance b in the engaged position for the purpose of minimizing noise and wear. Arm 358 has a pin 358b engaging in a vertical slot of a fixed guide bar 356, the arm being urged upwardly by a relatively strong spring 361 and being linked by a relatively weak spring 348 with another arm 349 carrying the pinch roller 109. Arm 349 has a free end engageable by latch 413 and at its opposite end is rigid with a guide bar 365 that is vertically slidable in the camera casing. Bar 365 has a slot 357 receiving a pin 363 on the end of arm 358 remote from catch 419.

In order to prevent any undesired pivoting of arm 358 about its extremity 358a engaged by the catch 419, facilitated by possible tolerances in the mounting of guide bar 365 or in the fit between slot 357 and pin 363, a second catch 419' may be coupled with catch 419 via an arm 419'' to form a parallelogrammatic linkage designed to hold the arm 358 horizontal, as indicated in dot-dash lines, catch 419' engaging a pin 358c on arm 358.

Figure 4B:
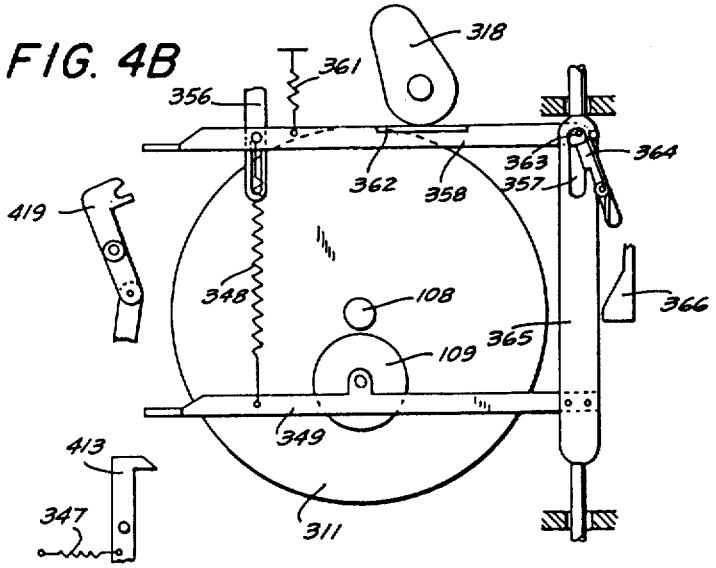

A spring-loaded detent 364, pivoted at 364a on bar 365, normally projects across the slot 357 so as to form a backstop for pin 363 after the latter has been elevated to the top of the slot upon the release of arm 358 from catch 419, as illustrated in FIG. 4B. Detent 364 coacts with a fixed cam 366 upon a lowering of bar 365 and arm 349 into the position of FIG. 4C in which the latch 413 engages the arm 349 while the detent 364 is deactivated so as to release the pin 363.

Figure 4C:
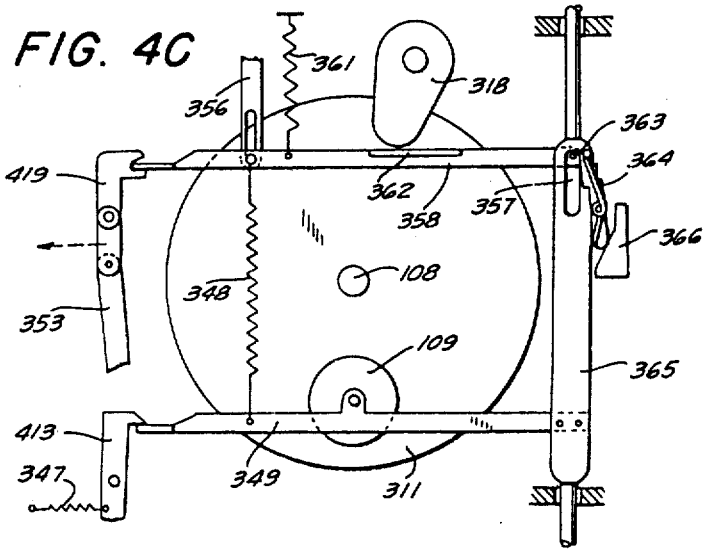

In the insertion position of FIG. 4C, springs 348 and 361 are both tensioned while the pinch roller 109 is held separated from capstan 108, arms 349 and 358 being respectively engaged by latch 413 and catch 419. Trigger 120 is moved by spring 359 sufficiently far to the left, from the depressed position shown in FIG. 4A, to open the switch 340 and to let the roller 344 come to rest in the groove 345 of its cam 342 while the roller 351 rides on the sloping part of cam 350. These rollers are biased downwardly by gravity supplemented, if desired, by a spring force.

Upon depression of trigger 120, with closure of switch 340, the position of lever 353 and catch 419 does not change since the rightward shift of cam 350 only results in an ineffectual raising of roller 351. Roller 344, however, stays in its groove 345 long enough to cause a counterclockwise swing of latch 413 whereby the lower arm 349 is freed and can be elevated by spring 348, together with guide bar 365, from the position of FIG. 4C into that of FIG. 4A in which the film F is clamped between roller 109 and capstan 108. Upon full depression of trigger 120, roller 344 escapes from the groove 345 and comes to rest on the sloping portion of cam 342 as shown in FIG. 4A, with latch 413 again bearing upon its stop 360.

When the trigger 120 is released, latch 413 remains unaffected by the leftward motion of cam 342 but cam 350 briefly swings the lever 353 clockwise as the roller 351 temporarily engages in groove 367. That swing, which causes a counterclockwise rotation of catch 419 to release the arm 358, is maintained long enough to insure that the cam 318 reaches the position of FIG. 4B without re-engaging the arm 358 with the catch 419. The timing of the return of this catch to its engaging position, FIGS. 4A and 4C, depends on such factors as the strength of springs 354 and 359 as well as the mass of lever 353 and catch 419. In the cam position of FIG. 4B, spring 361 raises the arm 358 and with it the pin 363 which, with bar 365 held elevated by spring 348, is backstopped by the detent 364 as the latter is no longer restrained by the cam 366. That action of the detent effectively consolidates the members 349, 358 and 365 into a unitary structure which, during the following half-revolution of cam 318 under the inertial force of flywheel 311, descends to the position of FIG. 4C wherein latch 413 re-engages the arm 349 and cam 366 liberates the pin 363. The cycle can then be repeated.

It will be apparent that, with minor modifications, the linkage 341, 350, 353 can also be used in lieu of the mechanism of FIG. 2E for the temporary withdrawal of catch 319 (FIG. 2C) from its engagement with lever 320.

Figure 5:
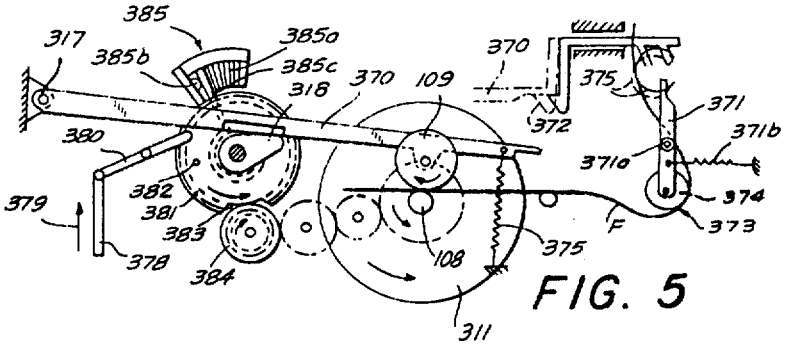
FIG. 5 is a view generally similar to FIG. 2C, showing a modified roller-control mechanism in film-clamping position.

FIG. 5 shows another embodiment in which the pinch roller 109 is carried on a lever 370 fulcrumed at 377, that lever again coacting with a cam 318 which is driven from capstan 108 via a step-up transmission here including a pinion 384 adapted to mesh with a gear 381 on the cam shaft. Gear 381 has a toothless peripheral zone 383 confronting the pinion 384 on standstill as well as in the operating position of FIG. 5 in which a spring 376 draws the pinch roller 109 toward capstan 108 in order to clamp the film F therebetween. The film coacts with a loop detector 373 including a roller 374 on an arm 371 fulcrumed at 371a, the other end of that arm being linked by an arcuate toggle spring 375 with a latch 372 adapted to engage the free end of lever 370 as indicated in phantom lines. A spring 371b tends to swing the arm 371 counterclockwise, that swing being limited by the film loop which on standstill is tighter than shown in FIG. 5 whereby toggle spring 375 holds the lever 370 engaged by latch 372. When the trigger 120 (FIG. 1) is depressed to energize the claw motor 106, the loop expands and the resulting counterclockwise rotation of arm 371 switches the spring 375 into its alternate position whereby latch 372 is withdrawn and spring 376 pulls the pinch roller 109 into its clamping position.

Upon the release of the trigger, capstan 108 and flywheel 311 continue their rotation for a limited period in a sense (here counterclockwise) tightening the film loop. This causes a clockwise return swing of arm 371 until spring 375 snaps into its alternate position in which latch 372 can intercept the free end of lever 370. A link 378, articulated to a lever 380, is then momentarily raised by the released trigger, as indicated by an arrow 379, with the aid of a mechanism similar to that of FIG. 2E or 4A whereby a pin 382 on gear 381 is depressed and moves the first tooth of that gear to the left of gap 383 into the orbit of the teeth of pinion 384. Gear 381 is thereby driven through a full revolution after which it is arrested, in exactly its original position, by a stationary device 385 including a ramp 385a and a boss 385b coacting with the free end of a coil spring 385c which is entrained by the gear 381, such a device having been described in commonly owned U.S. Pat. No. 3,746,227.

Cam 318, rotating with gear 381, re-engages the lever 370 with its latch 372 to restore the normal inactive position.

Since in this system the cam 318 acts directly upon the roller-supporting lever 370, there is no need to delay the return of the linkage 378, 380 to its illustrated position during the release of the trigger.

Figure 7:
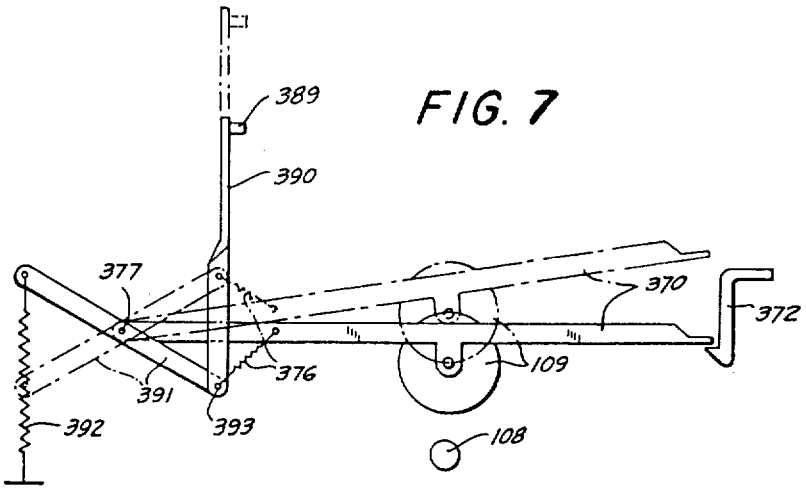
FIG. 7 is a face view of the lower part of the assembly shown in FIG. 6.
Figure 6:
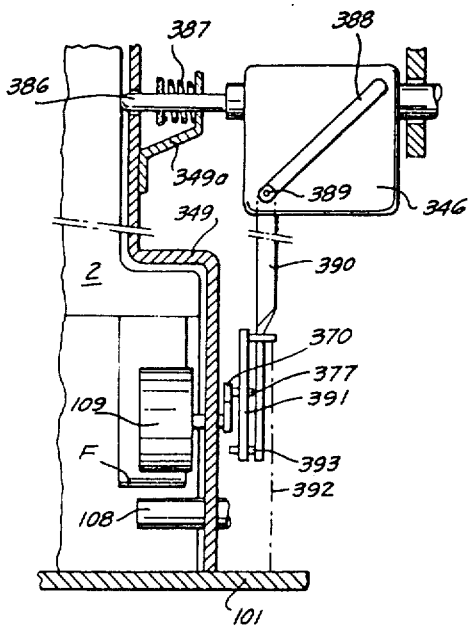
FIG. 6 is an elevational view of a linkage between a cassette sensor and an actuating mechanism according to a further embodiment.

We shall now describe, with reference to FIGS. 6 and 7, a system wherein a movable support member for the pinch roller is displaceable between a retracted position, a standby position and a clamping position.

The system of FIGS. 6 and 7 includes a cassette feeler 386, loaded by a spring 387, which is rigid with a camming plate 346 having an inclined slot 388 engaged by a pin 389 at the top of a vertical rod 390. The lower end of rod 390 is articulated by a pin 393 to a lever 391 pivoted at 377 to an arm 370 which carries the pinch roller 109; the opposite end of lever 391 is biased downwardly by a tension spring 392 anchored to the bottom of camera housing 101. Pin 393 is linked with arm 370 via a tension spring 376 designed to swing the arm 370 either clockwise or counterclockwise about its floating fulcrum 377, depending upon the position of rod 390. Spring 387 bears upon a bracket 349a rigid with a partition 349.

As long as no sound-film cassette 2 is inserted in the receiving chamber to the left of partition 349, spring 387 draws the camming plate 346 to the left whereby slot 388 elevates the rod 390 so that the parts assume the position shown in phantom lines in FIG. 7. In that position the pinch roller 109 is retracted from the capstan 108 which in this instance is disposed below the roller. Upon the insertion of a cassette 2, plate 346 moves to the right and lowers the rod 390 whereupon the toggle mechanism 376, 391 reverses the spring force acting on arm 370 so that the free end of this arm comes to rest, in a standby position, on the latch 372 preventing the establishment of the clamping position. The lower part of rod 390 is sufficiently flexible to allow the pin 389 to travel over nearly the full length of slot 388 under the action of the aforedescribed toggle mechanism, even though the lateral displacement of plate 346 extends over only a fraction of that length.

In order to let the capstan 108 drive the film F, latch 372 is released from arm 370 by depression of the trigger, either directly or through a loop detector as described with reference to FIG. 5. Removal of the cassette 2 reverses the operation of linkage 346, 390, 391 whereby arm 370 is swung counterclockwise (as viewed in FIG. 7) past the latch 372 into its retracted position.

In a simplified arrangement the lever 391 and the spring 376 could be omitted, the arm 370 being then rigid with rod 390 and being biased downwardly by the spring 392 directly anchored thereto. This, however, would require a steeper camming angle, with consequently increased wear of slot 388 and pin 389, and/or a larger stroke for the feeler 386 and the plate 346.

Figure 8:
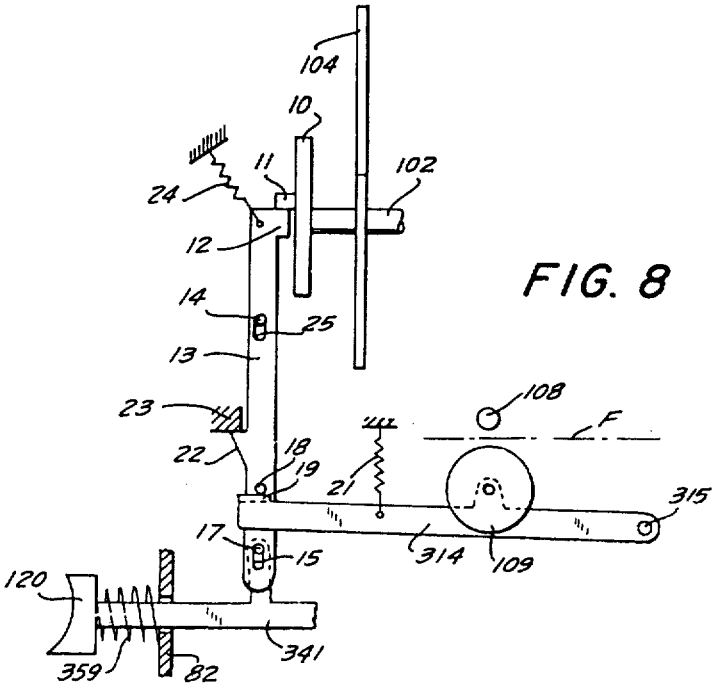
FIG. 8 shows a roller-control mechanism representing still another embodiment.

In FIG. 8 we have shown a modified claw drive in which the shaft 102, rotated by the motor 106 of FIG. 1 carries a disk 10 adjacent the shutter blade 104, that disk being provided with a boss 11 engageable with a lug 12 on the lever 13 which coacts with the lever 314 carrying the pinch roller 109. The lever 13 has an upper slot 25, receiving a fixed pin 14, and another slot 15 at the lower end of that lever accommodating a pin 17 on the stem 314 of trigger 120. A tooth 22 on lever 13 bears, in the position of FIG. 8, on a shoulder 23 of the casing wall under the tension of a spring 24 which tends to pull the lever upwardly and to the left, i.e. out of the path of boss 11. Lever 314, fulcrumed at 315, is under tension from a spring 21 urging it in the clockwise direction to elevate the pinch roller 109 toward capstan 108; such a movement, however, is prevented by a lug 19 on lever 314 and a coacting pin 18 on lever 13 as long as the latter lever is prevented from rising by the engagement of tooth 22 with shoulder 23.

When the trigger 120 on handgrip 82 is depressed against the force of its loading spring 359, lever 13 swings counterclockwise about pin 14 whereby lug 12 releases the boss 11 and tooth 22 is disengaged from shoulder 23. With drive motor 106 energized at the same time by trigger-controlled contacts such as those of switch 340 in FIG. 4A, shaft 102 is free to rotate and to reciprocate the traction claw 8 (FIG. 1). Lever 314 is also liberated, by the disalignment of pin 18 from lug 19 upon the counterclockwise swing of lever 13 which is then pulled up by the spring 24, whereby film F is clamped between the rotating capstan 108 and the pinch roller 109 as in the preceding embodiments. This position, in which the tooth 22 lies alongside the shoulder 23, is maintained as long as the trigger 120 is held depressed.

When the trigger is released, lever 13 is swung clockwise whereby lug 12 is thrust into the path of the orbiting boss 11 even as the pin 18 comes to lie once again above the lug 19. As soon as the traction claw returns to its normal standstill position, boss 11 strikes the lug 12 to lower the lever 13 whereby lever 314 is swung counterclockwise to separate the pinch roller 109 from the capstan 108. This lever motion, carried out against the relatively weak force of springs 21 and 24 by virtue of the residual kinetic energy stored in shutter 104 and disk 10, relatches the lever 13 by letting its tooth 22 reengage the shoulder 23 from below, thus restoring the original position.

In FIG. 9A we have diagrammatically illustrated a modification of the system of FIG. 8 designed to correlate not only the stopping but also the starting of the film advance by the capstan 108 with the displacement of the traction claw 8. Capstan 108 is here shown driven by a separate motor 37 whose energizing circuit, like that of claw motor 106, includes a switch 35 which is controlled by the trigger 120 through the intermediary of a toggle spring 41 linking the stem 341 with a switch contact 42.

Shutter 104 is here mounted on the claw-driving shaft 102 between a disk 110, carrying a box 111, and an axial cam 30 coacting with a rider 31 on a lever 33 which is fulcrumed at 43. The free lower end of lever 33 forms a latch 34 normally engaging a heel 39 of the roller-supporting lever 314 fulcrumed at 315. Lever 314 is here also shown to carry, alongside the pinch roller 109, a shelf 40 designed to lift the film F into close proximity with recording head 46 when the pinch roller is elevated into clamping position. Shelf 40, or a similar film support such as a roller, can also be mounted on the lever 314 or its equivalent in other embodiments.

Lever 314, biased counterclockwise by a spring 121, is linked at 44 with a lever 113 which is generally similar to lever 13 of FIG. 8 and has a slot 115 receiving a pin 117 on trigger stem 341. A lug 112 at the upper end of lever 113 is engageable by the boss 111 of disk 110 in essentially the manner described above.

Figure 9B:
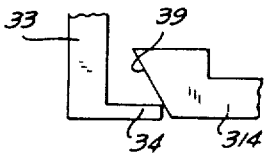
FIGS. 9B and 9C are detail views of parts of the mechanism of FIG. 9A in two different positions.
Figure 9C:
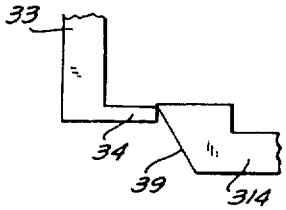

The heel 39 of lever 314, coacting with latch 34, has a beveled face, as more clearly shown in FIGS. 9B and 9C, for the purpose of moving the rider 31 out of the path of cam 30 when the latter has released the lever 314 by a clockwise swing of lever 33 about its fulcrum 43. Such a swing, occurring in a predetermined position of claw 8, follows the energization of motor 106 upon depression of trigger 120. As soon as the latch 34 unhooks the left-hand end of lever 314, as shown in FIG. 9B, spring 121 moves the pinch roller 109 into clamping position as the lever 314 swings counterclockwise until its beveled heel 39 almost leaves the latch 34 as shown in FIG. 9C. Since the depression of trigger 120 also swings the lever 113 in a clockwise sense about its point of articulation 44, boss 111 escapes a lug 112 at the upper end of lever 113 as long as the trigger is held depressed. With rider 31 withdrawn from the path of cam 30 as described above, wear and noise are again reduced to a minimum during operation of the film drive.

The axial cam 30 could be replaced by a radial cam or eccentric, with provision of a suitable linkage (e.g. a bell-crank lever) between an associated cam follower and the lever 33, or with lever 33 pivotally mounted for swinging in a plane perpendicular rather than parallel to shaft 102. It will also be apparent that the cam 30 or its equivalent could be carried on some other shaft driven by motor 106 and positively coupled with shaft 102 so as to release the roller-supporting member 314 in a predetermined position of traction claw 8.

As in the embodiment of FIG. 8, the residual kinetic energy stored in shutter 104 and other rotating elements of the claw drive is used to restore the original position of lever 314 and pinch roller 109 upon the release of trigger 120. Thus, the resulting counterclockwise swing of lever 113 about its pivot 44 again aligns the lug 112 with the boss 111 which, by elevating the lever 113, lets the latch 34 re-engage beneath the beveled heel 39 of lever 314 as spring 32 draws the rider 31 back into contact with cam 30.

We claim:

1. In a cine camera, in combination:

a casing adapted to accommodate a perforated motion-picture film having a sound track, said casing being provided with an exposure gate and sound-recording means;

electrically powered drive means in said casing for transporting said film past said exposure gate and said sound-recording means, said drive means including a reciprocable traction claw engageable with the film perforations in the vicinity of said exposure gate and further including a continuously rotatable capstan and a pinch roller adapted to clamp said film therebetween in the vicinity of said sound-recording means;

relatively displaceable support means for said pinch roller and said capstan, said support means including a movable member determining the relative spacing of said pinch roller and said capstan;

biasing means engaging said movable member for urging same from an inactive position into an active position in which the film is clamped between said capstan and said pinch roller;

latch means engageable with said movable member for releasably retaining same in said inactive position;

actuating means for energizing said drive means, said latch means being operatively linked with said actuating means for releasing said movable member at the start of a picture-taking operation; and restoring means coupled with said drive means for re-engaging said movable member with said latch means by residual kinetic energy upon a de-energization of said drive means by said actuating means.

2. The combination defined in claim 1 wherein said restoring means includes a rotatable flywheel mass.

3. The combination defined in claim 2 wherein said flywheel mass is rigid and coaxial with said capstan.

4. The combination defined in claim 2 wherein said drive means includes a continuously rotatable shaft coupled with said traction claw, said flywheel mass including a shutter disk mounted on said shaft in line with said exposure gate.

5. The combination defined in claim 1 wherein said latch means is operatively linked with said actuating means through the intermediary of said traction claw.

6. The combination defined in claim 5, further comprising a loop detector in said casing displaceable from a normal position into an off-normal position by a looped stretch of film engaged by said traction claw, said latch means being coupled with said loop detector.

7. The combination defined in claim 5, further comprising film-winding means in said casing including a reciprocable pawl mechanically coupled with said traction claw, said latch means being articulated to said pawl.

8. The combination defined in claim 1, further comprising presetting means operable independently of said actuating means to displace said movable member into said inactive position from an insertion position in which the relative spacing of said pinch roller and said capstan is greater than in said inactive position, said presetting means including a toggle mechanism, said biasing means being a spring forming part of said toggle mechanism and reversing the direction of its biasing force in said insertion position.

9. The combination defined in claim 8 wherein said presetting means includes a feeler extending into a cassette-receiving compartment of said casing for ascertaining the presence of a sound-film cassette therein.

10. The combination defined in claim 1 wherein said drive means includes a continuously rotatable shaft coupled with said traction claw, said restoring means comprising an element positively connected with said shaft for coacting with said movable member and concurrently arresting said traction claw in a predetermined position of the latter.

11. The combination defined in claim 10 wherein said latch means is operatively linked with said actuating means through a further element of said drive means positively coupled with said traction claw for releasing said movable member in another predetermined position of said traction claw.

12. The combination defined in claim 11 wherein said further element is a rotatable cam provided with a cam follower linked with said latch means.

13. The combination defined in claim 12 wherein said latch means and said movable member are provided with coacting camming formations for disengaging said cam follower from said cam in a released position of said movable member.

14. The combination defined in claim 1 wherein said restoring means includes a cam coupled with said drive means for continuous rotation thereby, said cam being provided with a cam follower linked with said movable member, and catch means linked with said actuating means for holding said cam follower out of contact with said cam during energization of said drive means.

*15. In a cine camera, in combination:*

*a casing adapted to accommodate a perforated motion-picture film having a sound track, said casing being provided with an exposure gate and sound-recording means;*

*electrically powered drive means in said casing for transporting said film past said exposure gate and said sound-recording means, said drive means including a reciprocable traction claw engageable with the film perforations in the vicinity of said exposure gate and further including a continuously rotatable capstan and a pinch roller adapted to clamp said film therebetween in the vicinity of said sound-recording means;*

*relatively displaceable support means for said pinch roller and said capstan, said support means including a movable first member determining the relative spacing of said pinch roller and said capstan;*

*a second member movable relatively to said first member;*

*first biasing means coupled with said movable members and effective in a predetermined position of said second member for urging said first member from an inactive position into an active position in which the film is clamped between said capstan and said pinch roller;*

*latch means engageable with said first member for releasably retaining same in said inactive position;*

*actuating means for energizing said drive means, said latch means being operatively linked with said drive means for releasing said first member at the start of a picture-taking operation;*

*restoring means controlled by said actuating means for displacing said second member from said predetermined position to an alternate position upon de-energization of said drive means to facilitate a return of said first member to said inactive position;*

*second biasing means connected with said first member for re-engaging same with said latch means upon displacement of said second member to said alternate position; and*

*cam means mechanically coupled with and receiving power from said drive means for returning said second member to said predetermined position after the re-engagement of said first member with said latch means and before the start of a new picture-taking operation.*

*16. The combination defined in claim 15 wherein said cam means is provided with a shaft rotatively entrained by said capstan via a transmission including a flywheel.*

*17. The combination defined in claim 15 wherein said members are levers, said first biasing means being a spring resiliently interlinking said levers.*

*18. In a cine camera, in combination:*

*a casing adapted to accommodate a perforated motion-picture film having a sound track, said casing being provided with an exposure gate and sound-recording means;*

*electrically powered drive means in said casing for transporting said film past said exposure gate and said sound-recording means, said drive means including a reciprocable traction claw engageable with the film perforations in the vicinity of said exposure gate and further including a continuously rotatable capstan and a pinch roller adapted to clamp said film therebetween in the vicinity of said sound-recording means;*

*relatively displaceable support means for said pinch roller and said capstan, said support means including a movable first member determining the relative spacing of said pinch roller and said capstan;*

*a second member movable relatively to said first member;*

*biasing means coupled with said movable members and effective in a predetermined position of said second member for urging said first member from an inactive position into an active position in which the film is clamped between said capstan and said pinch roller;*

*first latch means engageable with said first member for releasably retaining same in said inactive position;*

*second latch means engageable with said second member for releasably retaining same in said predetermined position;*

*actuating means for energizing said drive means, said first and second latch means being operatively linked with said actuating means for releasing said first member from said inactive position while holding said second member in said predetermined position at the start of a picture-taking operation, thereby allowing said biasing means to move said first member into said active position, and for deactivating said second latch means upon a de-energization of said drive means to release said second member into an alternate position with resulting return of said first member to said inactive position for re-engagement with said first latch means; and*

*restoring means coupled with and receiving power from said drive means for tensioning said biasing means by re-engaging said second member with said second latch means after the re-engagement of said first member with said first latch means and before the start of a new picture-taking operation.*

*19. The combination defined in claim 18 wherein said first member is a lever carrying said pinch roller.*

*20. In a cine camera, in combination:*

*a casing adapted to accommodate a perforated motion-picture film having a sound track, said casing being provided with an exposure gate and sound-recording means;*

*electrically powered drive means in said casing for transporting said film past said exposure gate and said sound-recording means, said drive means including a reciprocable traction claw engageable with the film perforations in the vicinity of said exposure gate and further including a continuously rotatable capstan and a pinch roller adapted to clamp said film therebetween in the vicinity of said sound-recording means;*

*relatively displaceable support means for said pinch roller and said capstan, said support means including a movable first member determining the relative spacing of said pinch roller and said capstan;*

*a second member movable relatively to said first member;*

*first biasing means coupled with said movable members and effective in a predetermined position of said second member for urging said first member from an inactive position into an active position in which the film is clamped between said capstan and said pinch roller;*

*latch means engageable with said first member for releasably retaining same in said inactive position;*

*actuating means for energizing said drive means, said latch means being operatively linked with said drive means for releasing said first member at the start of a picture-taking operation:*

*restoring means controlled by said actuating means for displacing said second member from said predetermined position to an alternate position upon de-energization of said drive means to facilitate a return of said first member to said inactive position;*

*second biasing means connected with said first member for re-engaging same with said latch means upon displacement of said second member to said alternate position; and*

*tensioning means coupled with and receiving power from said drive means for returning said second member to said predetermined position after the re-engagement of said first member with said latch means and before the start of a new picture-taking operation.*

* * * * *